(12) United States Patent
Fukagawa

(10) Patent No.: US 8,893,433 B2
(45) Date of Patent: Nov. 25, 2014

(54) WATER BLOCKING BOARD APPARATUS

(75) Inventor: Daiki Fukagawa, Tokyo (JP)

(73) Assignee: Lixil Suzuki Shutter Corporation, Tokyo (JP)

(*) Notice: Subject to any disclaimer, the term of this patent is extended or adjusted under 35 U.S.C. 154(b) by 0 days.

(21) Appl. No.: 14/003,102

(22) PCT Filed: May 10, 2012

(86) PCT No.: PCT/JP2012/062066
§ 371 (c)(1),
(2), (4) Date: Sep. 4, 2013

(87) PCT Pub. No.: WO2013/114640
PCT Pub. Date: Aug. 8, 2013

(65) Prior Publication Data
US 2013/0340340 A1 Dec. 26, 2013

(30) Foreign Application Priority Data

Jan. 31, 2012 (JP) .................................. 2012-018293

(51) Int. Cl.
*E06B 11/00* (2006.01)
(52) U.S. Cl.
USPC ................................................ 49/10; 49/131
(58) Field of Classification Search
USPC ........................................ 49/10, 131; 404/6, 9
See application file for complete search history.

(56) References Cited

U.S. PATENT DOCUMENTS 4,576,507 A * 3/1986 Terio .................................. 404/6

FOREIGN PATENT DOCUMENTS

JP 4-644734 B2 6/2010

OTHER PUBLICATIONS

International Search Report mailed Jul. 17, 2012; PCT/JP2012/062066.

* cited by examiner

*Primary Examiner* — Jerry Redman
(74) *Attorney, Agent, or Firm* — Ladas & Parry LLP

(57) ABSTRACT

Provided is a water blocking board apparatus which can improve reliability of the operation of a water blocking board, the apparatus having: a water blocking board configured to ascend from a road surface to block water; a water blocking board accommodating pit formed under the road surface so as to accommodate the board; a water collecting pit configured to let water to flow thereinto upon flooding; a water collecting bucket which accumulates water having flown into the water collecting pit and is configured to descend in the water collecting pit by the weight of the accumulated water; and a transmission mechanism which connects the board and the bucket and converts a descending force of the bucket into an ascending force of the board, at least one of the mechanism and the bucket being provided with a device for inhibiting inclination of the bucket.

11 Claims, 12 Drawing Sheets

Fig. 8A
Fig. 8B
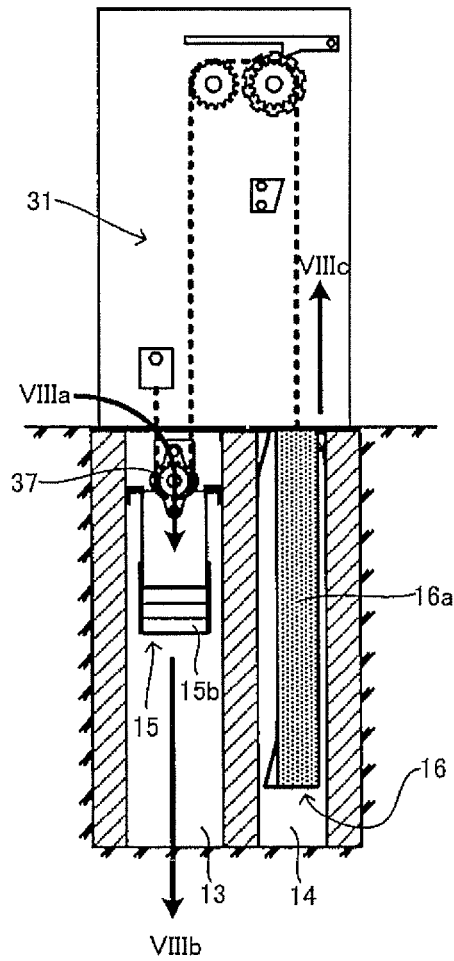
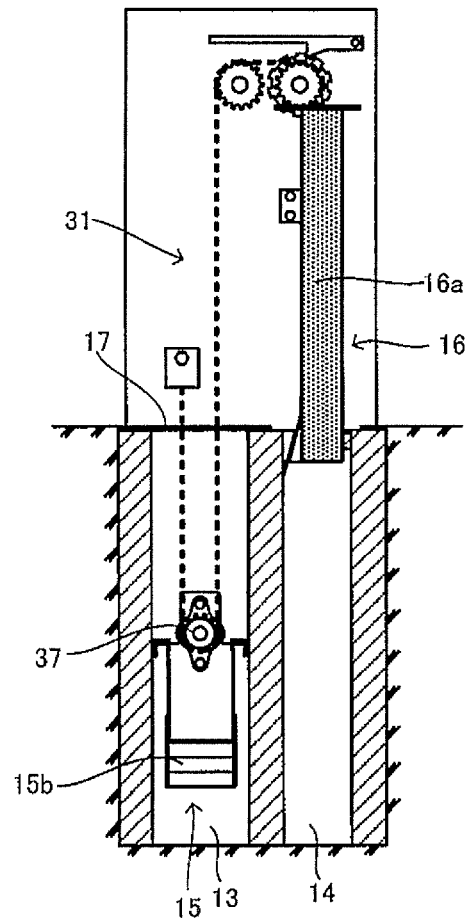

WATER BLOCKING BOARD APPARATUS

TECHNICAL FIELD

The present invention relates to a water blocking board apparatus for preventing water from entering a building and the like from a passage.

BACKGROUND ART

When roads and the like are submerged in water during heavy rains or floods, the water also enters buildings, parking lots, and the like that are located therearound and causes further damage. In this case, if a means to prevent the entry of water is provided in passages leading to the buildings, the parking lots, and the like, the damage can be reduced. Based on this viewpoint, there is a water blocking board apparatus which is arranged in passages and can prevent entry of a given amount or more of water.

Heretofore, various types of water blocking board apparatuses have been suggested, and a water blocking board apparatus as disclosed in Patent Document 1 for example is one of them. The water blocking board apparatus (flood preventing apparatus) described in Patent Document 1 has: a water collecting bucket which is disposed inside a water collecting pit being a groove dug from a road surface; and a water blocking board (flood preventing board) in a board shape which is arranged in an accommodating pit being a groove dug from another part on the road surface and is capable of projecting from and retracting into the accommodating pit. The water collecting bucket and the water blocking board are configured to pull each other by means of a lifting chain and a sprocket. At normal times, the water blocking board is accommodated in the accommodating pit and balanced in a position that an upper end of the water blocking board is in line with the road surface. On the other hand, in a case of flooding or the like, water accumulates in the water collecting bucket and the water collecting bucket descends due to the weight of the water; then, the water blocking board ascends in a manner being pulled up. The water blocking board ascends and thereby projects from the road surface so as to block part of the passage, and prevents further entry of water.

CITATION LIST

Patent Documents

Patent Document 1: Japanese Patent No. 4644734

DISCLOSURE OF THE INVENTION

Problems to be Solved by the Invention

As already known, water has the characteristic to flow in a lower direction. Therefore, when the water collecting bucket of the water blocking board apparatus described in Patent Document 1 is inclined, water flows toward a lower side of the water collecting bucket, and in some cases the inclination of the water collecting bucket is increased without being corrected. When the water collecting bucket tries to descend in the inclined state, it hits an inner wall of the water collecting pit and does not descend properly, therefore preventing the water blocking board from ascending, in some cases. Even if the water collecting bucket does descend, the water blocking board also ascends in an inclined manner as the water collecting bucket is inclined.

In view of the above problem, an object of the present invention is to provide a water blocking board apparatus which can improve reliability of the operation of a water blocking board.

Means for Solving the Problems

The present invention will be described hereinafter. The reference numerals given in accompanying drawings are shown in parentheses to make the present invention easy to understand, but the present invention is not limited to the embodiments shown in the drawings.

A first aspect of the present invention is a water blocking board apparatus (1, 101, 201) having: a water blocking board (16) which is configured to ascend from a road surface to block water in order to prevent water from entering a building and the like from a passage; a water blocking board accommodating pit (14) in a groove shape, the water blocking board accommodating pit being formed under the road surface so as to accommodate the water blocking board; a water collecting pit (13) in a groove shape, the water collecting pit being arranged in a passage where the water blocking board accommodating pit is formed, the water collecting pit being configured to allow water to flow thereinto upon flooding; a water collecting bucket (15) being a container which is disposed in the water collecting pit to accumulate water having flown into the water collecting pit and is configured to descend in the water collecting pit by a weight of the water accumulated in the water collecting bucket; and a transmission mechanism (31) which connects the water blocking board and the water collecting bucket with each other directly or via another component and converts a force for the water collecting bucket to descend into a force for the water blocking board to ascend, wherein at least one of the transmission mechanism and the water collecting bucket is provided with a device (40, 140, 140', 240) for inhibiting inclination of the water collecting bucket which prevents the water collecting bucket from inclining.

A second aspect of the present invention is the water blocking board apparatus (1, 101) according to the first aspect, wherein two transmission mechanisms (31) are arranged in an opposing manner with the water blocking board (16) therebetween; and the device (40, 140, 140') for inhibiting inclination of the water collecting bucket prevents the water collecting bucket from inclining by synchronizing the two transmission mechanisms.

A third aspect of the present invention is the water blocking board apparatus (1, 101) according to the first or second aspect, wherein two transmission mechanisms (31) are arranged in an opposing manner with the water blocking board (16) therebetween; each of the transmission mechanisms has a chain (32) which connects the water blocking board and the water collecting bucket (15) with each other, and a sprocket wheel (37) being a toothed wheel which is disposed at the water collecting bucket and engages the chain; and the device (40, 140, 140') for inhibiting inclination of the water collecting bucket has a connecting shaft bar (41) being a shaft which connects, directly or via another component, rotation axes of each sprocket wheel provided to the transmission mechanisms arranged in the opposing manner.

A fourth aspect of the present invention is the water blocking board apparatus (1, 101) according to the third aspect, wherein the connecting shaft bar (41) is disposed below a ground even in a state where the water collecting bucket (15) has risen.

Effects of the Invention

According to the present invention, the water collecting bucket is inhibited from inclining when descending in the water collecting pit, and therefore can descend smoothly. As such, the reliability of the operation of the water blocking board apparatus can be improved.

BRIEF DESCRIPTION OF THE DRAWINGS

FIG. 8A is a view illustrating an operation of the water blocking board apparatus and shows an accommodated position of the water blocking board.

FIG. 8B is a view illustrating the operation of the water blocking board apparatus and shows a projecting position of the water blocking board.

MODES FOR CARRYING OUT THE INVENTION

The functions and benefits of the present invention described above will be apparent from the following modes for carrying out the invention. The present invention will be described below based on the embodiments shown in the accompanying drawings, but is not limited to the embodiments.

Figure 1A:
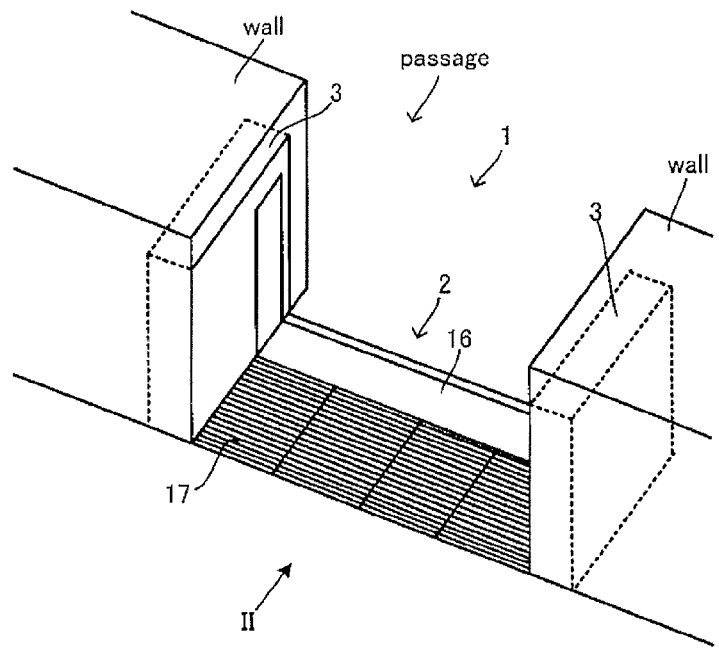
FIG. 1A is a perspective view of a passage where a water blocking board apparatus according to a first embodiment is disposed and shows a state in which the passage is open.
Figure 1B:
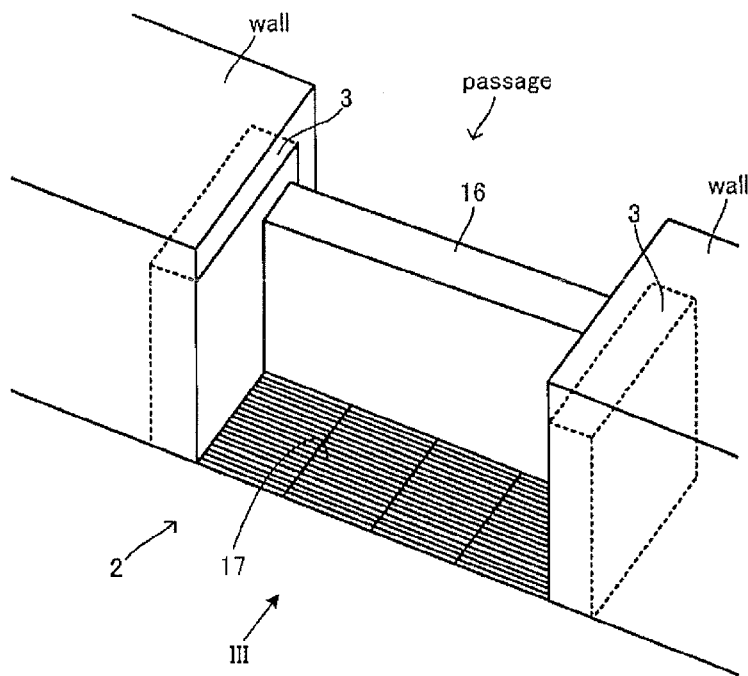
FIG. 1B is a perspective view of the passage where the water blocking board apparatus according to the first embodiment is disposed and shows a state in which part of the passage is closed.
Figure 2:
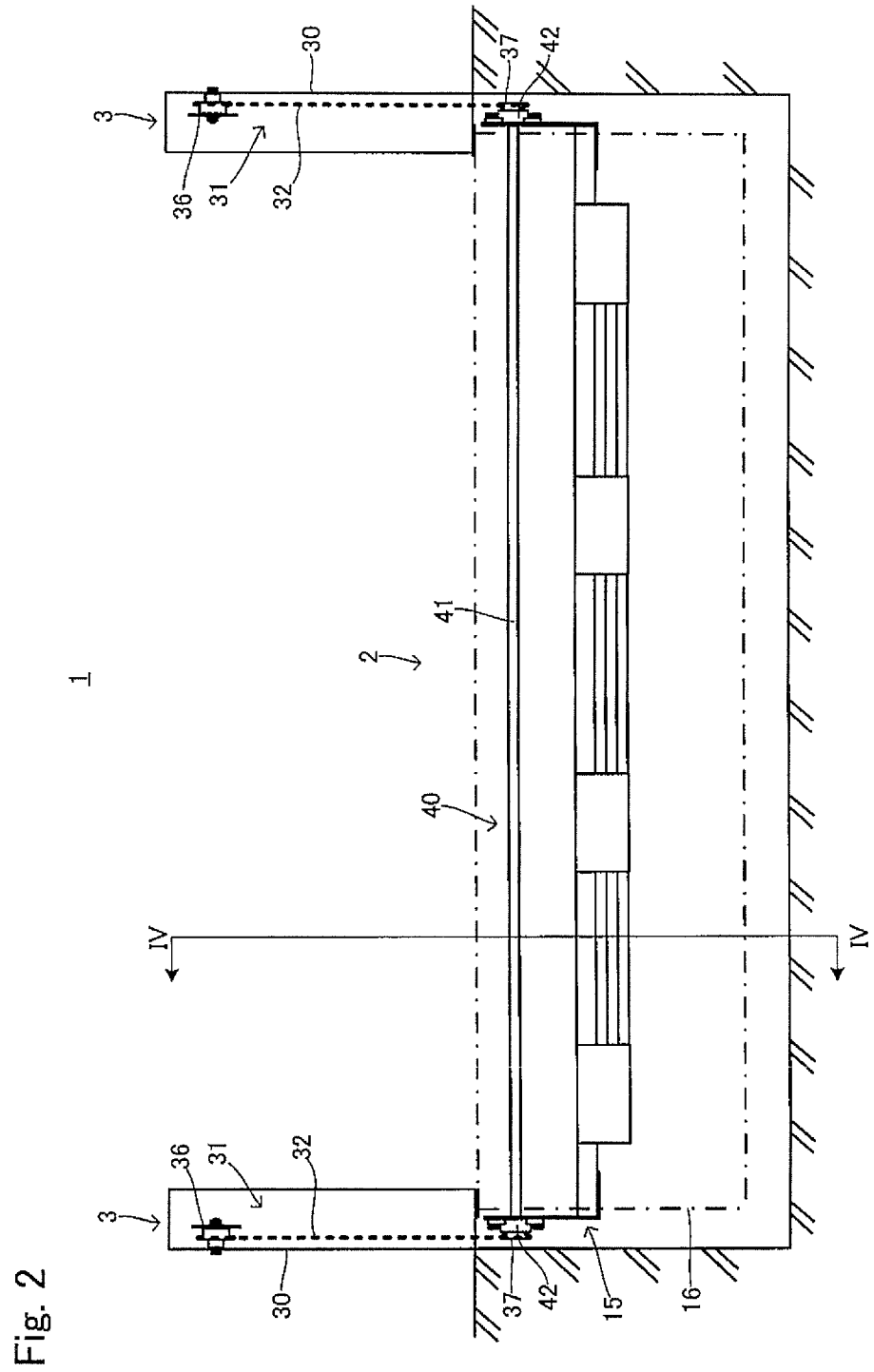
FIG. 2 is a front view of the water blocking board apparatus seen in the direction shown by II of FIG. 1A.
Figure 3:
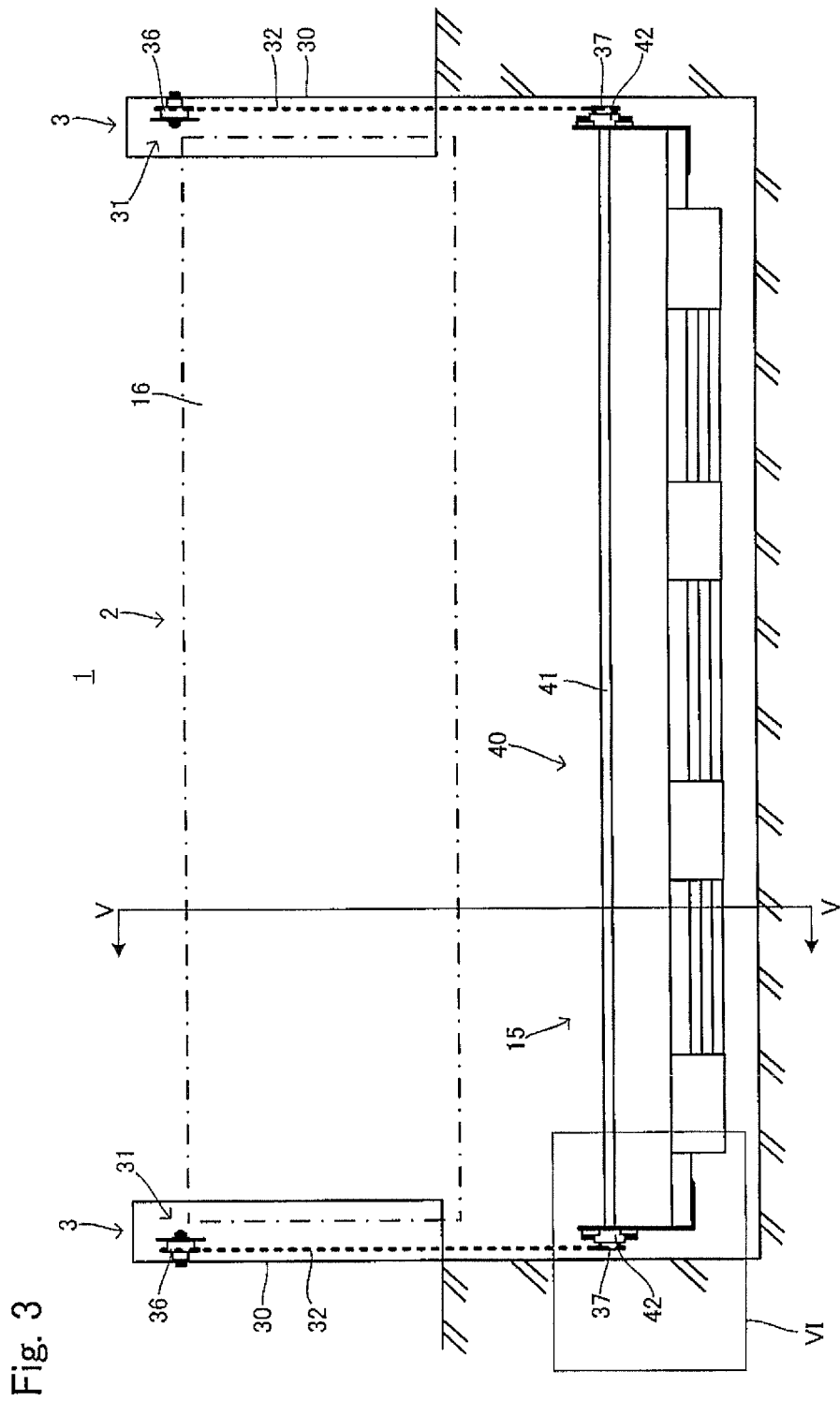
FIG. 3 is a front view of the water blocking board apparatus seen in the direction shown by III of FIG. 1B.
Figure 4:
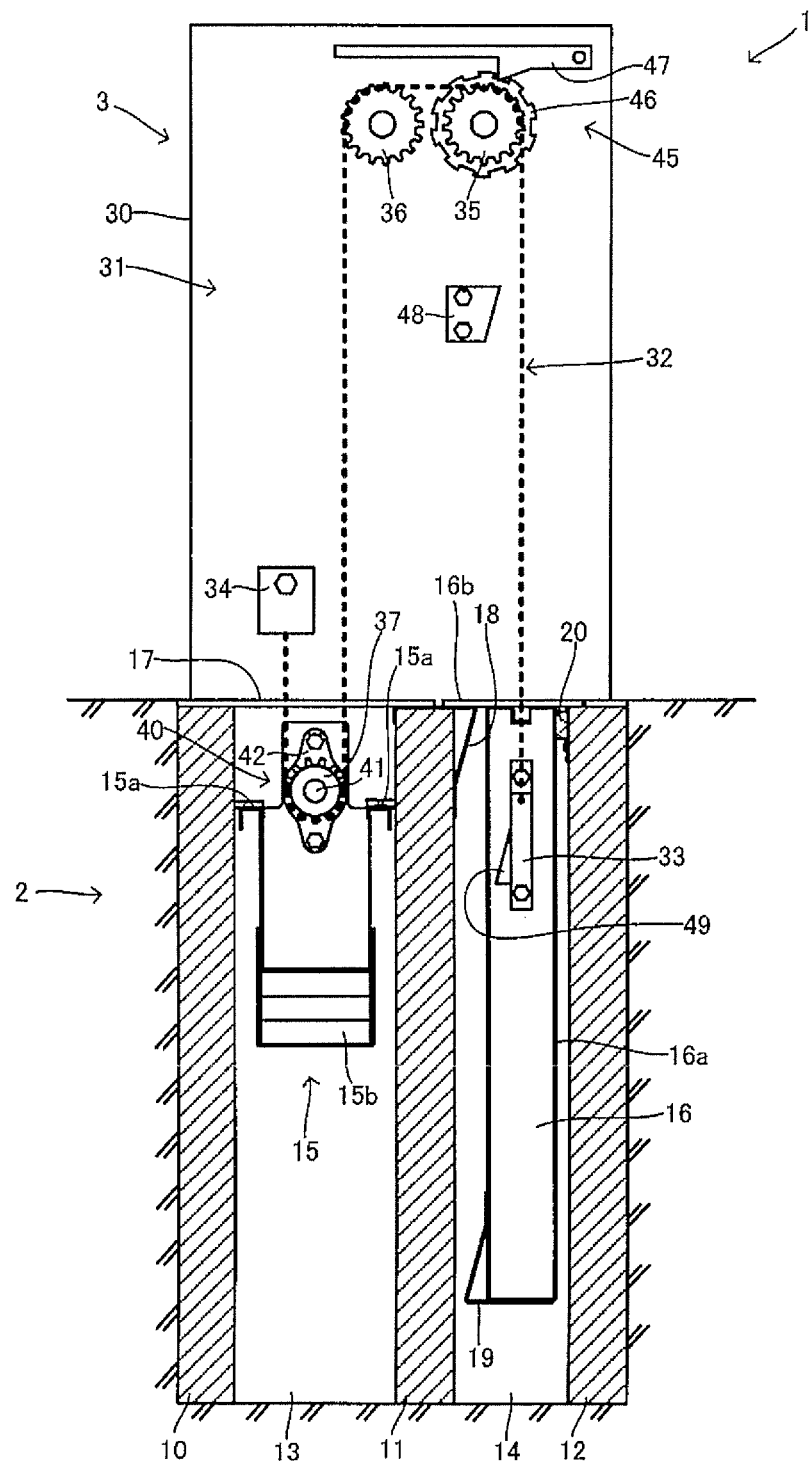
FIG. 4 is a cross-sectional view taken along the line shown by IV-IV of FIG. 2 and seen in the direction of the arrows.
Figure 5:
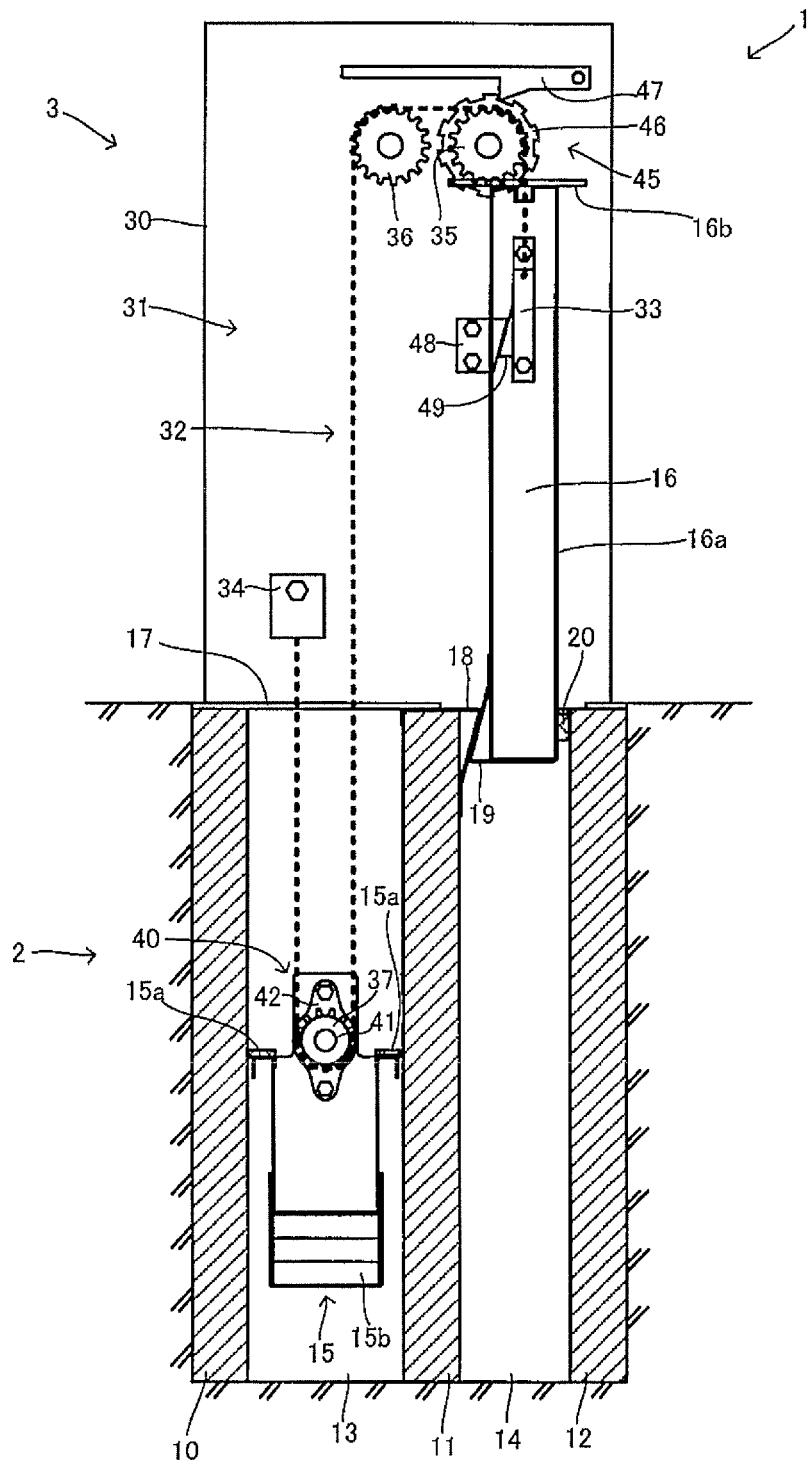
FIG. 5 is a cross-sectional view taken along the line shown by V-V of FIG. 3 and seen in the direction of the arrows.

FIG. 1 is a perspective view of a state in which the water blocking board apparatus 1 according to the first embodiment is disposed in a passage. FIG. 1A shows a state when a water blocking board 16 is accommodated in a water blocking board accommodating pit 14 (see FIG. 4) and when the passage is open. FIG. 1B shows a state when the water blocking board 16 is projecting from the water blocking board accommodating pit 14 to close part of the passage. FIG. 2 is a view of the water blocking board apparatus 1 seen in the direction shown by the arrow II of FIG. 1A, that is, seen from an entry side of the passage in the state when the passage is open. FIG. 3 is a view of the water blocking board apparatus 1 seen in the direction shown by the arrow III of FIG. 1B, that is, seen from the entry side of the passage in the state when part of the passage is closed. FIG. 4 is a cross-sectional view of the water blocking board apparatus 1 taken along the vertical line shown by IV-IV of FIG. 2 and seen in the direction of the arrows. FIG. 5 is a cross-sectional view of the water blocking board apparatus 1 taken along the vertical line shown by V-V of FIG. 3 and seen in the direction of the arrows. The water blocking board apparatus 1 will be described with reference to FIGS. 1 to 5 and each view shown as appropriate. In FIGS. 1 to 5 and each view that are referred to in the descriptions below, components are shown adequately in a penetrative manner for the illustration. In addition, some components are sometimes omitted in each view in order to make the view easy to see.

In the present embodiment, the entry side of the passage is on the lower side of FIGS. 1A and 1B which is shown obliquely from the left, and is on the left side of the drawing sheets of FIGS. 4 and 5; and the exit side of the passage is on the opposite side. Accordingly, FIGS. 2 and 3 are views of the water blocking board apparatus 1 seen from the entry side of the passage. That is, in a case of flooding or the like, water enters from the entry side of the passage.

The water blocking board apparatus 1 has a passage open-close part 2 and a mechanism accommodation part 3. As seen in FIGS. 1 to 3, the mechanism accommodation part 3 is arranged on both one end and the other end of the passage open-close part 2, so as to stand in an opposing manner. As is apparent from FIGS. 1A and 1B, the water blocking board apparatus 1 is disposed in a passage that is formed between walls. More specifically, the passage open-close part 2 is buried in a road surface forming the passage, and the mechanism accommodation part 3 is disposed on/in each of the walls forming the passage. With this configuration, the passage is open at normal times, as shown in FIG. 1A and FIG. 2, allowing passing therethrough. On the other hand, in a case of flooding or the like, the water blocking board 16 ascends as shown in FIG. 3 to block part of the passage, thereby enabling prevention of further entry of water. The passage open-close part 2 and the mechanism accommodation part 3 will be described below in more detail.

As shown in FIGS. 2 to 5, the passage open-close part 2 has: partitioning members 10, 11, 12; a water collecting bucket 15; a water blocking board 16; a lid member 17; members 18, 19 for pressing the water blocking board; and a sealing member 20. Since the passage open-close part 2 is buried in the road surface of the passage as described above, each member constituting the passage open-close part 2 is basically also buried therein, except for some components.

The partitioning members 10, 11, 12 are board-shaped members which have a substantially rectangular cross section, as shown in FIGS. 4 and 5 and extend in the right-and-left direction of the water blocking board apparatus 1 (right-and-left direction of the drawing sheets of FIGS. 2 and 3; back-and-front direction of the drawing sheets of FIGS. 4 and 5). The partitioning members 10, 11, 12 are aligned at predetermined intervals in the entry-and-exit direction of the passage (back-and-front direction of the drawing sheets of FIGS. 2 and 3; right-and-left direction of the drawing sheets of FIGS. 4 and 5), so that the board faces thereof face one another. In the present embodiment, the partitioning member 10, the partitioning member 11, and the partitioning member 12 are aligned in the mentioned order from the entry side to the exit side of the passage.

Herein, a water collecting pit 13 is formed by a space between the partitioning member 10 and the partitioning member 11, and a water blocking board accommodating pit 14 is formed by a space between the partitioning member 11 and the partitioning member 12.

The lid member 17 is arranged on an upper opening of the water collecting pit 13 in a manner to cover it, thereby forming a part of the surface of the passage. The lid member 17 is formed by grating and is configured to communicate the space above the ground with the water collecting pit 13 to let water flow into the water collecting pit 13.

The water collecting bucket 15 is a container for accumulating water flowing into the water collecting pit 13. It has a cross section shown in FIGS. 4 and 5 and extends in the right-and-left direction of the water blocking board apparatus 1 as shown in FIGS. 2 and 3. The water collecting bucket 15 is accommodated in the water collecting pit 13 and is capable of ascending and descending in the water collecting pit 13. In specific, the water collecting bucket 15 is formed slightly smaller than the water collecting pit 13 in the right-and-left direction of the water blocking board apparatus 1, and allows water to flow thereinto from its upper opening and to be accumulated therein.

Preferably, the water collecting bucket 15 has an entire height which is no more than a half of the depth of the water collecting pit 13, and is configured not to hit the bottom surface of the water collecting pit 13 at its lowest position in its upward and downward motion.

A sealing member 15a is disposed on an upper end of the water collecting bucket 15. It is attached thereon so as to block a gap between the water collecting bucket 15 and an inner wall surface of the water collecting pit 13. This can prevent water from entering the gap between the water collecting bucket 15 and the water collecting pit 13 and accumulating in the water collecting pit 13.

Further, the water collecting bucket 15 has a weight 15b placed in a lower part thereof and is balanced with the water blocking board 16 as described below. The weight 15b can be placed or removed piece by piece so that the weight of the weight 15b can be adjusted.

The water blocking board 16 is a thick-board-shaped member which is capable of blocking water by closing at least part of the passage in a raised position. It has a cross section shown in FIGS. 4 and 5, and extends in the right-and-left direction of the water blocking board apparatus 1 as shown by the dashed-dotted line in FIGS. 2 and 3.

The water blocking board 16 has a water blocking board body 16a which serves to block water, and a lid member 16b made of a steel plate which is fixed to an upper end portion of the water blocking board body 16a to form a part of the passage.

An inner part of the water blocking board body 16a is formed of a foam material panel which is light and strong, such as foamed polystyrene, and the entire surface of the foam material panel is covered with a thin plate material having corrosion resistance and strength, such as a stainless steel plate. Since, in this manner, the foam material panel which is light and has a small specific weight is used inside the water blocking board body 16a, the weight of the water blocking board 16 is reduced. Thereby, it is possible to reduce force needed to hang the water blocking board 16 so as to be able to raise and lower it as described below. Moreover, since the surface of the foam material panel is covered with a thin plate which is harder than the foam material panel, the foam material panel can be protected against damage.

Although an example of using the foam material panel for the water blocking board body 16a is shown herein, possibilities of using another material are not excluded. For example, a honeycomb core material may also be employed. This can improve the strength.

The lid member 16b is a plate-shaped member made of a steel plate which is fixed to an upper end portion of the water blocking board body 16a to form a part of the passage. A surface of the lid member 16b on the road surface side preferably has a plurality of protrusions formed thereon. Thereby, pedestrians or vehicles can be prevented from slipping. The steel plate employed for the lid member 16b is preferably formed of the same material as the thin plate material of the water blocking board body 16a described above.

Of the constituent elements of the water blocking board 16 described above, the water blocking board body 16a is disposed in the water blocking board accommodating pit 14 in a manner capable of projecting from and retracting into the water blocking board accommodating pit 14. That is, the water blocking board body 16a is arranged to be able to take the position in which it is accommodated entirely in the water blocking board accommodating pit 14 and take the position in which a part of it is accommodated in the water blocking board accommodating pit 14 and the other part of it is projected to the passage.

In addition, the lid member 16b covers an opening of the water blocking board accommodating pit 14 in a manner to close the opening, in the state when the water blocking board body 16a is accommodated entirely in the water blocking board accommodating pit 14.

Herein, the water blocking board 16 is formed to have a weight which is heavier than the total weight of the water collecting bucket 15, a device 40 for inhibiting inclination of the water collecting bucket and a moving sprocket 37 described below. Thereby, the water blocking board 16 can be accommodated properly in the water blocking board accommodating pit 14 at normal times, as described below.

As shown in FIGS. 4 and 5, the member 18 for pressing the water blocking board is arranged on an upper part of a wall face of the water blocking board accommodating pit 14 on the entry side of the passage (the left side of the drawing sheets of FIGS. 4 and 5). The member 18 for pressing the water blocking board has a portion inclined upward to the exit side of the passage (the right side of the drawing sheets of FIGS. 4 and 5), as can be seen in FIGS. 4 and 5.

On the other hand, the member 19 for pressing the water blocking board which corresponds to the member 18 for pressing the water blocking board is provided on a lower part of the water blocking board 16 on the entry side of the passage. The member 19 for pressing the water blocking board has an inclined portion as does the member 18 for pressing the water blocking board.

In addition, the sealing member 20 is arranged on an upper part of a wall face of the water blocking board accommodating pit 14 on the exit side of the passage.

According to the members 18, 19 for pressing the water blocking board and the sealing member 20 configured in this manner, the member 18 for pressing the water blocking board and the member 19 for pressing the water blocking board are disposed in an overlapping manner, in the state when the water blocking board 16 has been raised as shown in FIG. 5. At this time, the members 18, 19 for pressing the water blocking board press the water blocking board 16 toward the exit side of the passage by the effect of contact between the inclined portions of the members 18, 19 for pressing the water blocking board. Since the water blocking board 16 is pressed securely to the sealing member 20, water can be stopped more surely.

Herein, a water drain device may be arranged at the bottom of the water collecting pit 13 and the water blocking board accommodating pit 14. This can inhibit accumulation of water in the pits. In this case, it is preferable for the water drain device to have a backflow prevention valve to prevent water from flowing back into the water collecting pit or the water blocking board accommodating pit.

The mechanism accommodation part 3 will be described next. The mechanism accommodation part 3 is arranged on both ends, in the right-and-left direction, of the passage open-close part 2, and is provided on/in the walls forming the passage, as described above. Accordingly, two mechanism accommodation parts 3 are arranged in an opposing manner with the passage open-close part 2 therebetween, as shown in FIGS. 1 to 3. Since the basic structures of the two mechanism accommodation parts 3 are the same, only one of them will be described herein.

The mechanism accommodation part 3 has a housing 30 and a transmission mechanism 31 accommodated in the housing 30.

The housing 30 is a member to form an outer shell of the mechanism accommodation part 3 and is configured in a box shape to thereby be able to include the transmission mechanism 31 thereinside. Accordingly, the housing 30 is formed to be hollow inside with board-shaped components combined, for example.

The transmission mechanism 31 has a function to interlock the water collecting bucket 15 and the water blocking board 16 to associate the ascent and descent thereof with each other. That is, it is a mechanism to connect the water blocking board 16 and the water collecting bucket 15 to each other and convert a force for the water collecting bucket 15 to descend into a force for the water blocking board 16 to ascend. As such, the transmission mechanism 31 has a lifting chain 32, a first guide sprocket 35, a second guide sprocket 36, a moving sprocket 37, a device 40 for inhibiting inclination of the water collecting bucket, a ratchet mechanism 45, and members 48, 49 for pressing the water blocking board.

The lifting chain 32 functions as a force transmission member to transmit the force between the water collecting bucket 15 and the water blocking board 16 so as to interlock them. The lifting chain is shown by a simple broken line in the figures to make it easy to view. One end of the lifting chain 32 is fixed to the housing 30 by a fixation member 34. Therefore, the end portion fixed by the fixation member 34 is prohibited from moving. On the other hand, the other end of the lifting chain 32 is fixed to a side surface of the water blocking board 16 in the right-and-left direction thereof by a fixation member 33. Therefore, the other end of the lifting chain 32 moves up and down in conjunction with the ascent and descent of the water blocking board 16.

Further, a portion between both ends of the lifting chain 32 is engaged with the first guide sprocket 35, the second sprocket 36, and the moving sprocket 37, and is held inside the housing 30.

The first guide sprocket 35 is a sprocket wheel having a plurality of teeth formed on an outer circumference thereof, the teeth being engageable with the lifting chain 32. Therefore, the first guide sprocket 35 is capable of rotating with the center thereof as an axis, and the axis is fixed to the housing 30 to be prohibited from moving. That is, the first guide sprocket 35 is disposed in a manner capable of rotating while being fixed to a predetermined position of the housing 30.

The first guide sprocket 35 is arranged on an upper side of the water blocking board 16, and a height position of the first guide sprocket 35 (a position in the upper-and-lower direction of the drawing sheets of FIGS. 4 and 5) is a position that allows the water blocking board 16 to be held by the lifting chain 32 even in the position of being raised to the highest. On the other hand, a position of the first guide sprocket 35 in the direction of the entry and exit side of the passage (a position in the right-and-left direction of the drawing sheets of FIGS. 4 and 5) is not particularly limited, but a configuration is preferred in which one end side of the lifting chain 32 extends vertically downward from a side of the first guide sprocket 35 on the exit side of the passage (the right side of the drawing sheets of FIGS. 4 and 5) and the end is fixed to the water blocking board 16. This makes it possible to pull the water blocking board 16 straight up and move up and down the water blocking board 16 more smoothly.

The second guide sprocket 36 is a sprocket wheel having a plurality of teeth formed on an outer circumference thereof, the teeth being engageable with the lifting chain 32, as is the first guide sprocket 35. Therefore, the second guide sprocket 36 is capable of rotating with the center thereof as an axis, and the axis is fixed to the housing 30 to be prohibited from moving. That is, the second guide sprocket 36 is disposed in a manner capable of rotating while being fixed to a predetermined position of the housing 30.

The second guide sprocket 36 is disposed closer to the entry side of the passage (the left side of the drawing sheets of FIGS. 4 and 5) than the first guide sprocket 35 is, and a height position of the second guide sprocket 36 is substantially the same as that of the first guide sprocket 35.

The moving sprocket 37 is a sprocket wheel having a plurality of teeth formed on an outer circumference thereof, the teeth being engageable with the lifting chain 32. The moving sprocket 37 is capable of rotating with the center thereof as an axis, and the axis is arranged at an end of the water collecting bucket 15 in the right-and-left direction of the passage open-close part 2 (an end in the right-and-left direction of the drawing sheets of FIGS. 2 and 3).

Since the water collecting bucket 15 is arranged to be able to move upward and downward as described above, the moving sprocket 37 can also move up and down following the water collecting bucket 15.

The lifting chain 32 is engaged with the first guide sprocket 35, the second guide sprocket 36, and the moving sprocket 37 described above, in the following manner. A portion of the lifting chain 32 between the end portion thereof on the entry side of the passage and the end portion thereof on the exit side of the passage is hung on an upper side of the first guide sprocket and the second guide sprocket. On the other hand, the moving sprocket 37 is fitted with the lifting chain 32 in a manner being put thereon in a position between the second guide sprocket 36 and the end portion of the lifting chain 32 on the entry side of the passage. That is, the water collecting bucket 15 is hung downward in a manner being hooked to the lifting chain 32 via the moving sprocket 37. Specific operation of these components will be described below in detail.

Figure 6:
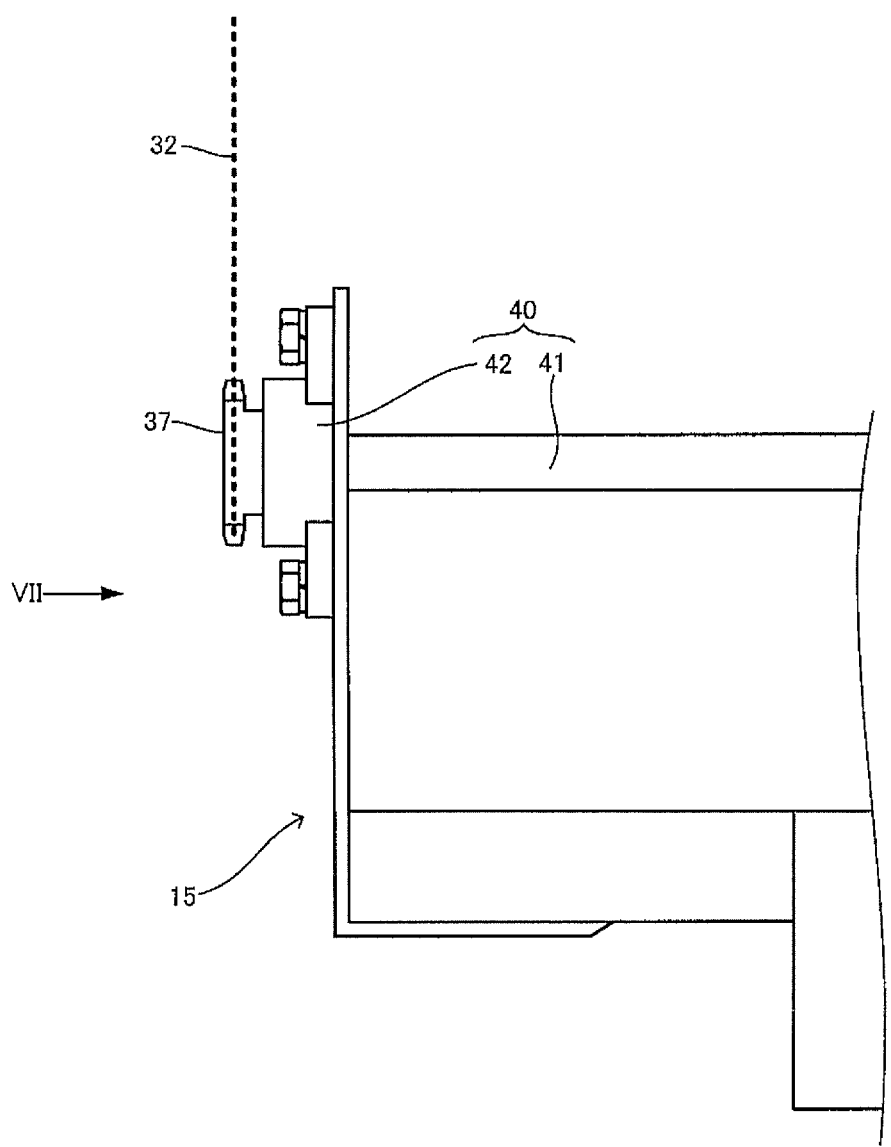
FIG. 6 is an enlarged view of the part shown by VI of FIG. 3.
Figure 7:
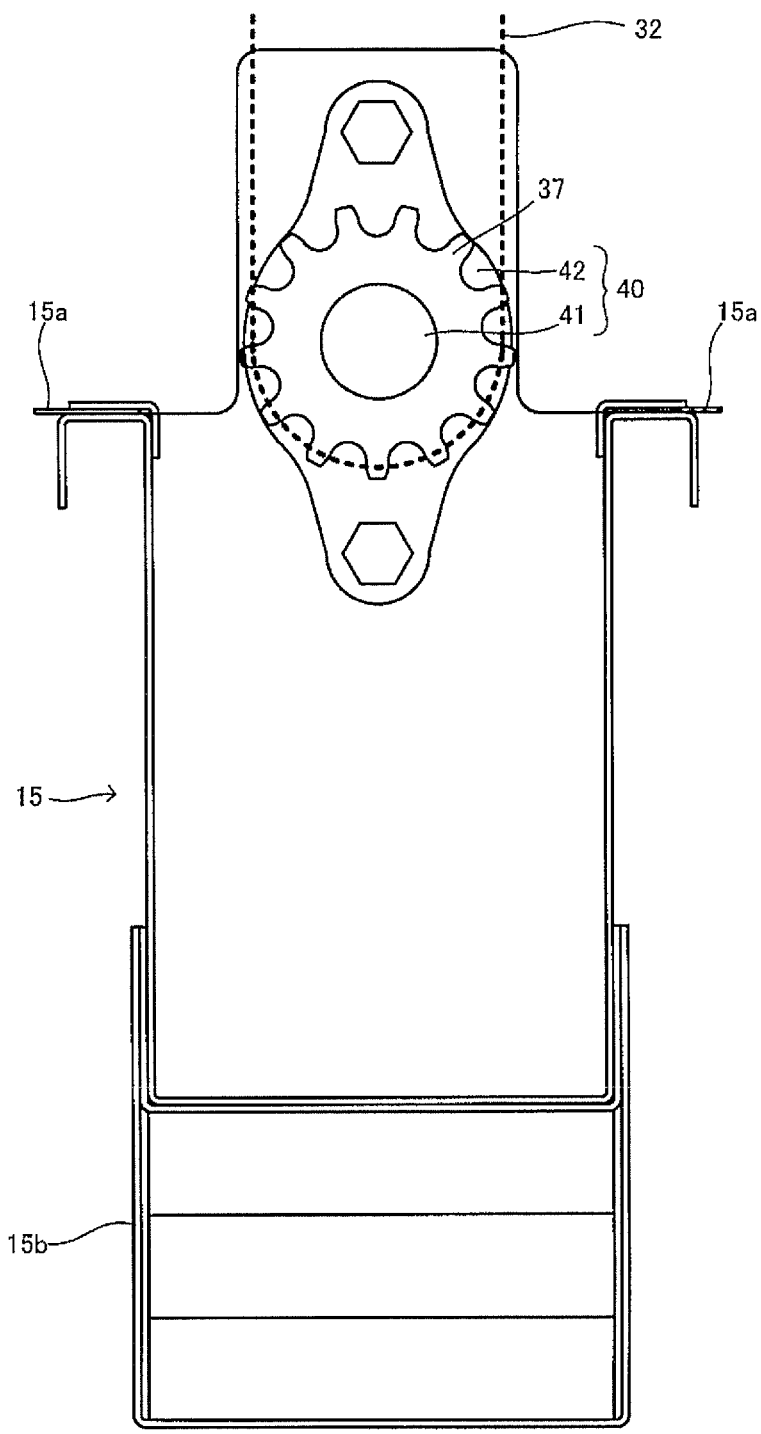
FIG. 7 is a view seen in the direction shown by the arrow VII of FIG. 6.

The device 40 for inhibiting inclination of the water collecting bucket is a device to control the water collecting bucket 15 not to incline in the view shown in FIGS. 2 and 3 when the water collecting bucket 15 ascends and descends. In the present embodiment, an example of inhibiting the inclination by synchronizing two moving sprockets opposing to each other will be shown. FIG. 6 shows an enlarged view of the part shown by VI in FIG. 3. FIG. 7 is a view seen in the direction shown by the arrow VII of FIG. 6.

The device 40 for preventing inclination of the water collecting bucket has a connecting shaft bar 41 and a bearing 42.

The connecting shaft bar 41 is a so-called shaft in a bar shape. One end of the connecting shaft bar 41 is arranged on a rotation axis of one of the moving sprockets 37, and the other end of the connecting shaft bar 41 is arranged on a rotation axis of the other moving sprocket 37 (see FIGS. 2 and 3). The material or the cross-sectional shape of the connecting shaft bar 41 is not particularly limited as long as the connecting shaft bar 41 can function as a shaft. Examples of the connecting shaft bar 41 include hollow stainless round bars.

The bearing 42 is for bearing the connecting shaft bar 41. It is placed between the water collecting bucket 15 and the moving sprocket 37, and is fixed to the water collecting bucket 15. It functions as a bearing with the connecting shaft bar 41 passed thereinto. The bearing 42 may be of any type as long as it enables smooth and stable rotation of the rotary shaft and is designed for that purpose, as in ordinary bearings. Examples thereof include commonly known bearings.

With the device 40 for inhibiting inclination of the water collecting bucket described above, the two moving sprockets 37 that are arranged on both sides in the right-and-left direction respectively, are connected to each other. Therefore, it is possible to synchronize the rotation of the two moving sprockets 37 and force them to rotate in the same manner. This can prevent inclination of the water collecting bucket 15 which is caused by the difference in the rotation speed of the two moving sprockets, as described below.

Herein, when the water collecting bucket 15 is disposed at its upper limit position in the condition of the water blocking board apparatus 1 at normal times as shown in FIG. 4, the connecting shaft bar 41 is disposed lower than the lid member 17. It is because the connecting shaft bar 41 would be an obstacle if it projected from the ground at normal times.

In the present embodiment, the bearing 42 is disposed only on both ends of the connecting shaft bar 41, but is not limited to this configuration. A bearing may be further arranged along a longitudinal direction of the connecting shaft bar. This can inhibit the flexure of the connecting shaft bar.

Back to FIGS. 2 to 5, description of the water blocking board apparatus 1 will be continued.

The ratchet mechanism 45 functions to prohibit the water blocking board from descending once it has ascended, and in the present embodiment it has a ratchet wheel 46 and a locking member 47. The ratchet mechanism 45 constitutes a so-called ratchet, and permits rotation of the first guide sprocket 35 in one direction and prohibits rotation thereof in the other direction.

The ratchet wheel 46 is a toothed wheel for the ratchet, the wheel having a plurality of ratchet teeth which can be locked by the locking member 47, the plurality of ratchet teeth being formed on an outer circumference of the ratchet wheel 46. The ratchet wheel 46 is arranged coaxially on the first guide sprocket 35. The ratchet wheel 46 and the first guide sprocket 35 are fixed to each other so that they always move in tandem with each other.

The locking member 47 has a locking protrusion which engages to stop the ratchet teeth of the ratchet wheel 46. The locking protrusion is in such a shape that it engages to stop the ratchet teeth of the ratchet wheel 46 so as to fulfill the function as a ratchet.

Of the rotations of the first guide sprocket 35, the rotation in a direction in which the water blocking board 16 ascends is permitted by the ratchet mechanism 45, and the rotation in a direction in which the water blocking board 16 descends is prohibited by the ratchet mechanism 45. Since this prevents the water blocking board 16 from descending once it has ascended, the passage can be closed surely.

The members 48, 49 for pressing the water blocking board form a pair together, and are block-shaped members that are formed such that faces thereof are oblique which contact each other when the water blocking board ascends and the members 48, 49 for pressing the water blocking board are disposed in a facing manner, as shown in FIG. 5. The member 48 for pressing the water blocking board is fixed to the housing 30. On the other hand, the member 49 for pressing the water blocking board is fixed to a side face of the water blocking board 16 in the right-and-left direction. In the present embodiment, the member 49 for pressing the water blocking board is arranged on the fixation member 33. As seen in FIG. 5, the members 48, 49 for pressing the water blocking board are arranged in a manner that the oblique faces thereof contact each other in the state that the water blocking board 16 has ascended. Thereby, the water blocking board 16 can be pressed to the exit side of the passage by the wedge effect, and the performance of stopping water by the water blocking board 16 can be improved.

Next, the operation of the water blocking board apparatus 1 configured as above will be explained. FIG. 8 shows views to illustrate the operation. FIG. 8A corresponds to FIG. 4, and FIG. 8B corresponds to FIG. 5. That is, FIG. 8A shows the state in which the water blocking board 16 is at its lowest position and in which the water collecting bucket 15 is at its highest position. They take these respective positions at normal times. On the other hand, FIG. 8B shows the state in which the water blocking board 16 has ascended to block part of the passage and in which the water collecting bucket 15 is lowered. They take these respective positions in the case of flooding. In order to prioritize the viewability of FIG. 8, many of the numeral references are omitted in FIG. 8. For the numeral references, FIGS. 4 and 5 corresponding to FIGS. 8A and 8B respectively, can be referred to.

As shown in FIG. 8A, the water blocking board apparatus 1 is arranged, at normal times, such that the water collecting bucket 15 is disposed in the upper part of the water collecting pit 13 and that the water blocking board body 16a of the water blocking board 16 is entirely accommodated in the water blocking board accommodating pit 14. That is, since the motions of the water collecting bucket 15 and the water blocking board 16 are determined by the balance taken between them by their weight via the transmission mechanism 31, the balance between them is made by placing or removing the weight 15b of the water collecting bucket in order for them to take the position shown in FIGS. 4 and 8A at normal times. In the condition shown in FIG. 8A, the passage is open, and therefore people, cars, and the like are not hindered from passing through the passage. Further, the water blocking board apparatus 1 is configured such that the lid members 16b and 17 do not cause unevenness on the road surface, therefore allowing comfortable passage.

On the other hand, if water starts to accumulate on the road surface due to a flood or the like, the water flows into the water collecting pit 13 through the lid member 17 formed by grating, as shown by VIIIa in FIG. 8A, and starts to accumulate in the water collecting bucket 15. Then, if the water continues to flow into the water collecting pit 13 in this manner, it accumulates in the water collecting bucket 15 sequentially.

As described above, the motions of the water collecting bucket 15 and the water blocking board 16 are determined by the balance taken between them by their weight via the transmission mechanism 31; and when a predetermined amount or more of water is accumulated in the water collecting bucket 15 in the above manner, the total weight of the water collecting bucket 15, the moving sprocket 37, the device 40 for inhibiting inclination of the water collecting bucket, and the accumulated water is to become larger than the weight of the water blocking board 16. If the total weight thereof may not exceed the weight of the water blocking board 16, it is adjusted by the removable weight 15b in advance. Thereby, when the water that has flown and accumulated in the water collecting bucket 15 reaches a predetermined weight, the total weight of the water collecting bucket 15, the moving sprocket 37, the device 40 for inhibiting inclination of the water collecting bucket, and the accumulated water exceeds the weight of the water blocking board 16 due to the weight of the accumulated water, and the water collecting bucket 15 descends in the water collecting pit 13 as shown by VIIIb in FIG. 8A. Then, the moving sprocket 37 descends substantially vertically together with the water collecting bucket 15 due to the descending force of the water collecting bucket 15, while rotating.

In this manner, the water collecting bucket 15 descends with the moving sprocket 37 rotating, and the water blocking board 16, following this, moves up as shown by VIIIc in FIG. 8A to rise to the passage gradually. As a result, the water blocking board 16 blocks water from entering the passage as shown in FIG. 8B.

Since the transmission mechanism 31 as described above is configured to have the lifting chain 32 and the sprockets 35, 36, and 37, it is possible to pull up the water blocking board 16 with the lifting chain 32 engaged with each of the sprockets 35, 36, and 37 and inhibit wear or slippage between the lifting chain 32 and each of the sprockets 35, 36, and 37 caused by transmission of the ascending force to the water blocking board 16.

The water blocking board 16 can be raised by the basic operation as described above. Since such operation does not require supply of electrical energy, reliable operation can be provided even in cases of unexpected heavy rains, floods, and the like, where the electricity is not used.

On the other hand, in the conventional water blocking board apparatus, water flows in a lower direction if the water collecting bucket is inclined in the right-and-left direction (right-and-left direction of the drawing sheet in FIG. 2) for some reason, and in some cases further inclination is caused without correction of the inclination. If water accumulates in the water collecting bucket and the water collecting bucket starts to descend while inclined, the sprockets each disposed independently on both sides of the water collecting bucket descend separately while rotating. If there is a difference in the rotation angles of the sprockets, the lifting chains also move differently. Accordingly, the water collecting board connected to the lifting chains ascends differently between the right side and the left side thereof, causing inclination of the water blocking board. Then, the water collecting bucket or the water blocking board hits the inner wall of the pit, preventing the water collecting bucket from descending properly. As such, the water blocking board is prevented from ascending. Even if the water blocking board does ascend, it ascends in an inclined manner in some cases.

By contrast, according to the water blocking board apparatus 1 of the present embodiment, since the device 40 for inhibiting inclination of the water collecting bucket forces the two moving sprockets 37 to rotate in the same manner, both of the transmission mechanisms 31 operate in the same manner. Thereby, the water collecting bucket 15 and the water blocking board 16 are prevented from ascending and descending in the inclined manner, leading to reliable operation thereof.

Figure 9:
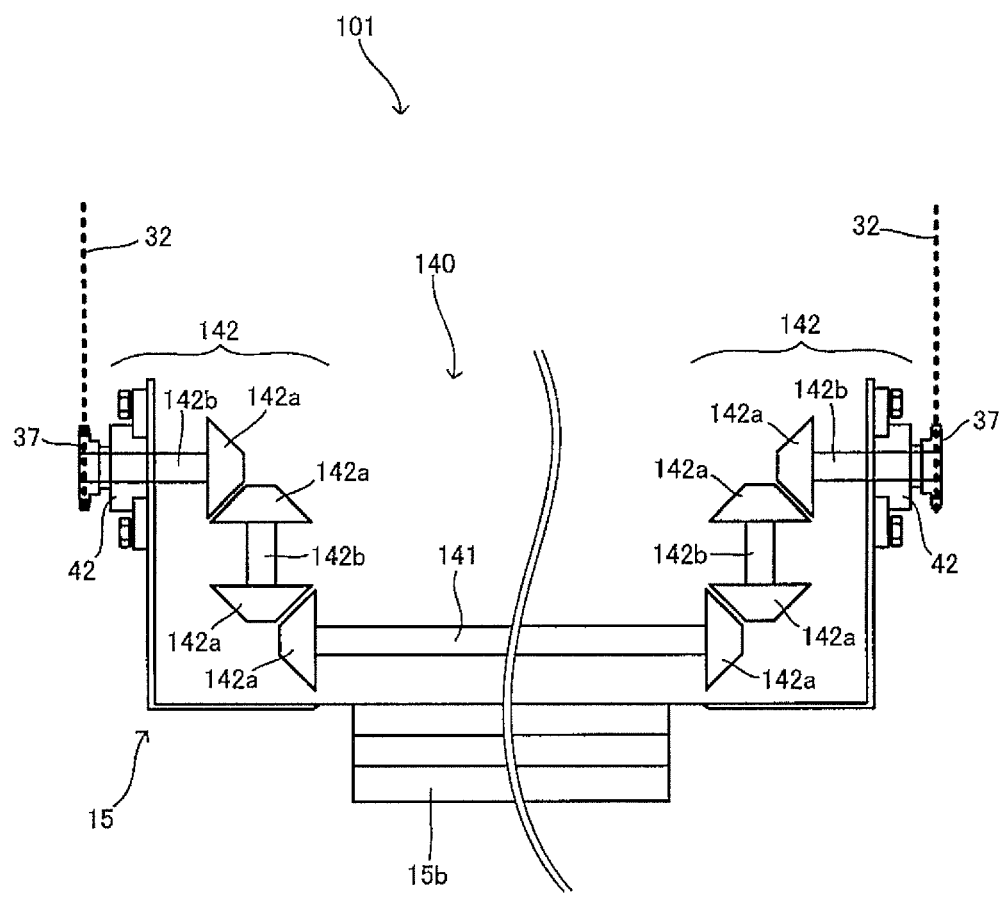
FIG. 9 is a view illustrating a device 140 for inhibiting inclination of a water collecting bucket of a water blocking board apparatus according to a second embodiment.

FIG. 9 is a view focusing on a water collecting bucket 15, a moving sprocket 37, part of a lifting chain 32, and a device 140 for inhibiting inclination of the water collecting bucket of a water blocking board apparatus 101 according to a second embodiment, among the components provided to the water blocking board apparatus 101. FIG. 9 is a view of the water blocking board apparatus 101 seen in the same perspective as in FIGS. 2 and 3. The water blocking board apparatus 101 differs from the water blocking board apparatus 1 described above in that it employs the device 140 for inhibiting inclination of the water collecting bucket instead of the device 40 for inhibiting inclination of the water collecting bucket. Other than this, the water blocking board apparatus 101 has the same components as those of the water blocking board apparatus 1. Descriptions of the same components will be omitted.

The device 140 for inhibiting inclination of the water collecting bucket is one of the examples of inhibiting inclination of the water collecting bucket by synchronizing two moving sprockets opposing to each other, and has a connecting shaft bar 141, an auxiliary mechanism 142, and a bearing 42.

The connecting shaft bar 141 is a so-called shaft in a bar shape. The auxiliary mechanism 142 is disposed on both ends of the connecting shaft bar 141, and the connecting shaft bar 141 is connected to two moving sprockets 37 via the auxiliary mechanism 142. The material and the cross-sectional shape of the connecting shaft bar 141 are not particularly limited as long as the connecting shaft bar 141 can function as a shaft. Examples thereof include hollow stainless round bars.

The auxiliary mechanism 142 is disposed between the connecting shaft bar 141 and the moving sprocket 37. One end of the auxiliary mechanism 142 is connected to the connecting shaft bar 141 as described above, and the other end thereof is connected to the moving sprocket 37. At this time, the two moving sprockets 37, the connecting shaft bar 141, and the two auxiliary mechanisms 142 are connected in a manner capable of transmitting the rotary motions thereof to one another.

A specific configuration of the auxiliary mechanism is not particularly limited as long as it can connect the two moving sprockets with the connecting shaft bar so as to transmit the rotary motions thereof to each other. In the present embodiment, as seen in FIG. 9, the auxiliary mechanism 142 is capable of transmitting the rotary motion by means of two auxiliary shafts 142b and miter gears 142a arranged on end portions of the auxiliary shafts 142b and an end portion of the connecting shaft bar 141, respectively.

The bearing 42 is for bearing the auxiliary shaft 142b of the auxiliary mechanism 142. It is disposed between the water collecting bucket 15 and the moving sprocket 37, and is fixed to the water collecting bucket 15. It functions as a bearing with the auxiliary shaft 142b passed thereinto. The bearing 42 may be of any type as long as it enables smooth and stable rotation of the rotary shaft and is designed for that purpose, as in ordinary bearings. Examples thereof include commonly known bearings.

With the device 140 for inhibiting inclination of the water collecting bucket configured as above, the two moving sprockets 37 arranged on both sides in the right-and-left direction respectively, are connected to each other by the connecting shaft bar 141 and the auxiliary mechanisms 142. Therefore, it is possible to synchronize the rotation of the two moving sprockets 37 and force them to rotate in the same manner. This can prevent inclination of the water collecting bucket 15 which is caused by the difference in the rotation speed of the two moving sprockets 37, as in the device 40 for inhibiting inclination of the water collecting bucket.

In addition, with the auxiliary mechanism 142, the device 140 for inhibiting inclination of the water collecting bucket can have high flexibility in a position to dispose the connecting shaft bar 141. For example, when a pipe to let water flow into the water collecting pit 13 or a member to guide water is additionally arranged, adjustment can be made by the auxiliary mechanism 142 such that the connecting shaft bar 141 does not contact the pipe or the like.

Figure 10:
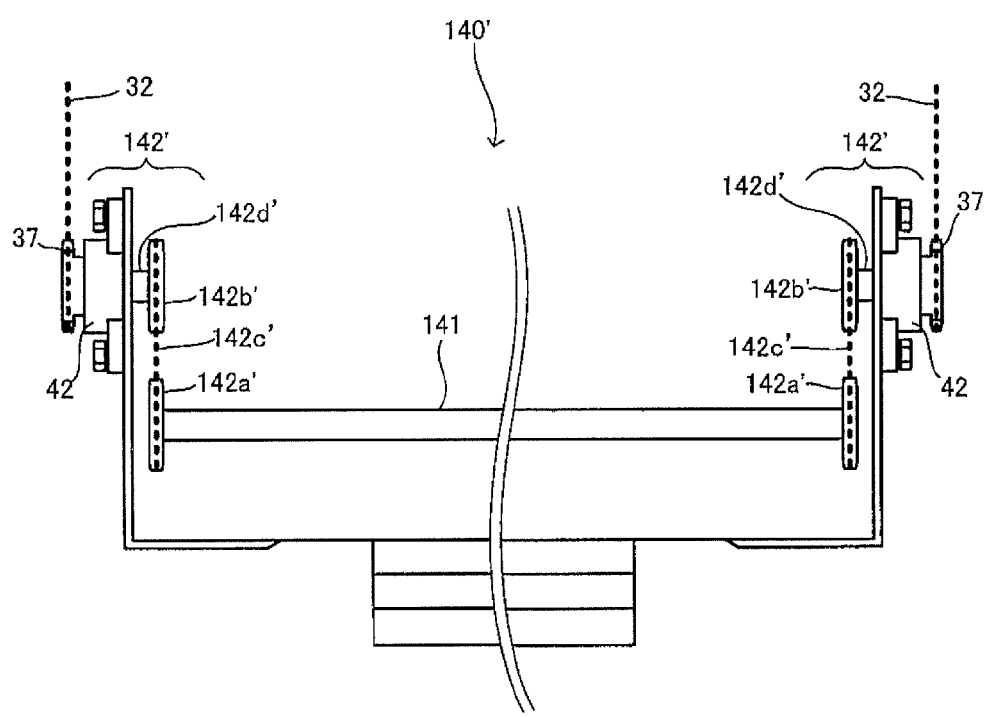
FIG. 10 is a view illustrating a modification device 140' for inhibiting inclination of the water collecting bucket of the water blocking board apparatus according to the second embodiment.

FIG. 10 is a view illustrating a device 140' for inhibiting inclination of the water collecting bucket, the device being a modification of the device 140 for inhibiting inclination of the water collecting bucket. FIG. 10 is a view of the device 140' for inhibiting inclination of the water collecting bucket seen in the same perspective as in FIG. 9. The device 140' for inhibiting inclination of the water collecting bucket has an auxiliary mechanism 142' whose configuration differs from that of the auxiliary mechanism 142 described above.

The auxiliary mechanism 142' is disposed between the moving sprocket 37 and the connecting shaft bar 141 while supported by the bearing 42, and has a first pulley 142a', a second pulley 142b', a belt 142c', and an auxiliary shaft 142d'.

The auxiliary shaft 142d' is fixed to the rotation axis of the moving sprocket 37. The first pulley 142a' is fixed to an end of the connecting shaft bar 141, and the second pulley 142b' is fixed to an end of the auxiliary shaft 142d'. The belt 142c' is arranged over the first pulley 142a' and the second pulley 142b'.

With the auxiliary mechanism 142' configured as above as well, the two moving sprockets 37 that are arranged on both sides in the right-and-left direction respectively, are connected with each other via the connecting shaft bar 141 and the auxiliary mechanisms 142'. Therefore, it is possible to synchronize the rotation of the two moving sprockets 37 and force them to rotate in the same manner. This can prevent inclination of the water collecting bucket 15 which is caused by the difference in the rotation speed of the two moving sprockets, as in the device 40 for inhibiting inclination of the water collecting bucket.

In each of the embodiments described above, the connecting shaft bars 41 and 141 employed in the devices for inhibiting inclination of the water collecting bucket may be configured as follows.

The connecting shaft bars 41 and 141 may be formed of a flexible material, to be so-called flexible shafts. Thereby, when a pipe to let water flow into the water collecting pit 13 or a member to guide water is additionally arranged for example, the connecting shaft bar can be disposed in a bent manner so as to avoid the pipe or the like, allowing high flexibility in the arrangement of components.

The connecting shaft bars 41 and 141 may also be configured to rotate in an eccentric manner. In the eccentric rotation of the connecting shaft bar, the centrifugal force is increased, enabling facilitation of the rotational force. As such, the effect of increasing the rotation speed of the shaft and causing the shaft to rotate more works. Thereby, force to operate the transmission mechanism can be given strongly even when there are some factors to prevent operation of the mechanism, such as degradation of sliding properties of the components provided to the transmission mechanism.

Specific means to cause the eccentric rotation of the connecting shaft is not particularly limited, and any possible means commonly known may be adopted. For example, looking at the cross-sectional shape of the connecting shaft bar, configuring the connecting shaft bar so that a rotation center of the connecting shaft bar and a center of the gravity of the connecting shaft bar in its cross-sectional shape are displaced from each other, can be raised. As the degree of the positional displacement is larger, the eccentricity is larger.

Figure 11:
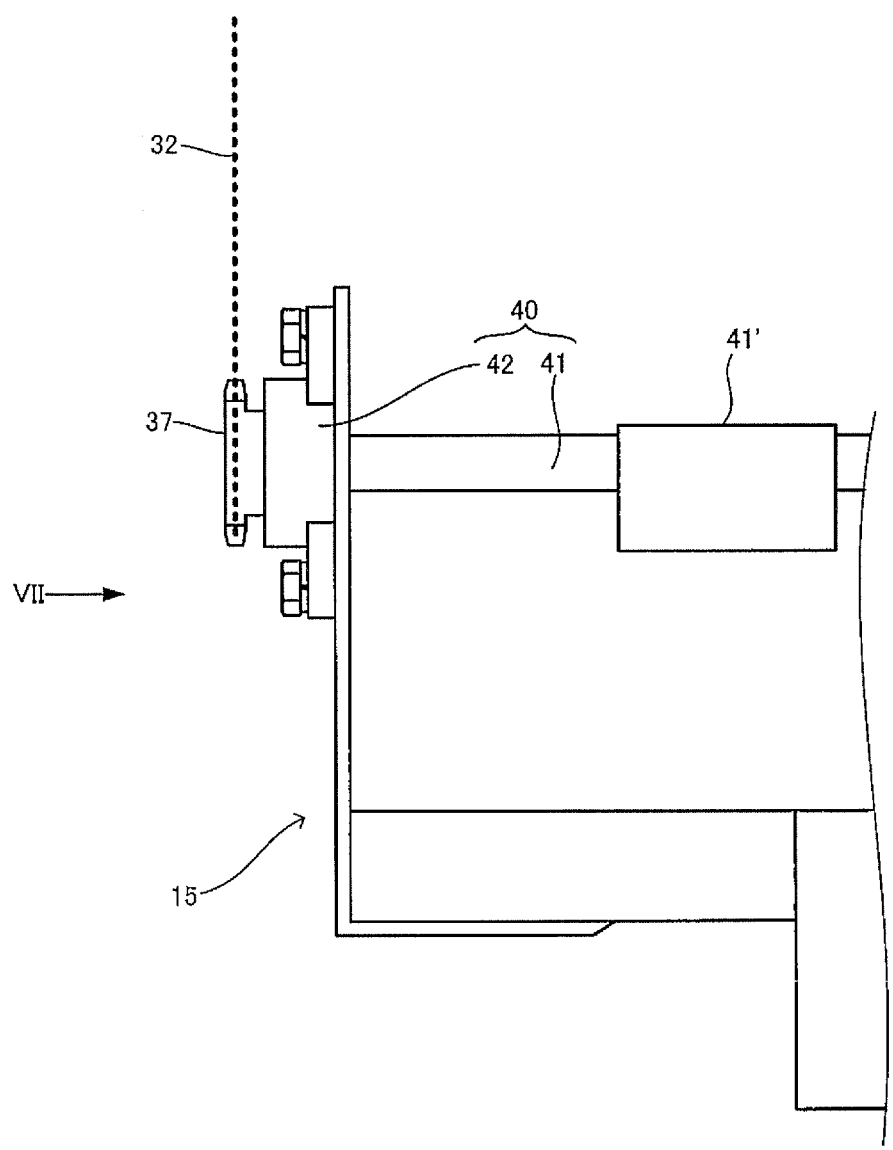
FIG. 11 is a view illustrating one example of eccentricity of a connecting shaft bar.

On the other hand, looking at the connecting shaft bar in its longitudinal direction, one or more member(s) 41' for eccentricity which is(are) not concentric with the connecting shaft bar 41 may be arranged, as shown in FIG. 11 for example; the connecting shaft bar itself may be curved; or a curved portion may be formed on the connecting shaft bar itself.

Figure 12:
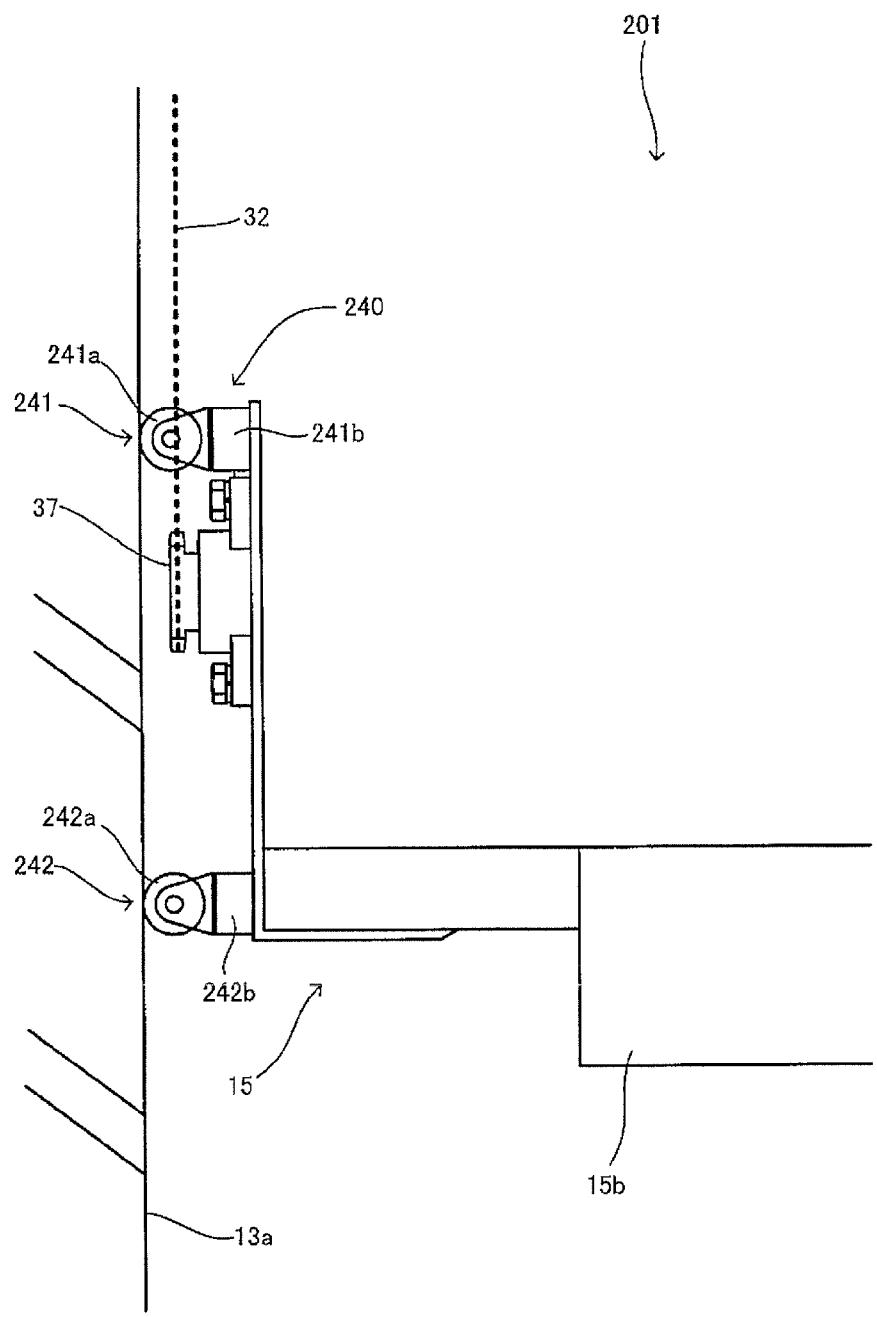
FIG. 12 is a view illustrating a device 240 for inhibiting inclination of a water collecting bucket of a water blocking board apparatus according to a third embodiment.

FIG. 12 shows a view of some components of a water blocking board apparatus 201 according to a third embodiment, the view corresponding to FIG. 6. Namely, FIG. 12 is a view focusing on an end of a water collecting bucket 15 on one side in the right-and-left direction, a moving sprocket 37, part of a lifting chain 32, and one side of a device 240 for inhibiting inclination of the water collecting bucket. The water blocking board apparatus 201 has the same components on the other side as well in a manner that they oppose to each other.

The water blocking board apparatus 201 differs from the water blocking board apparatus 1 described above in that it employs the device 240 for inhibiting inclination of the water collecting bucket instead of the device 40 for inhibiting inclination of the water collecting bucket. Other than this, the water blocking board apparatus 201 has the same components as those of the water blocking board apparatus 1. Descriptions of the same components will be omitted.

The device 240 for inhibiting inclination of the water collecting bucket is one of the examples of inhibiting inclination of the water collecting bucket by directly restricting inclination of the water collecting bucket in the right-and-left direction, and has two guide rollers 241 and 242.

The guide rollers 241 and 242 respectively have wheels 241a and 242a, and base materials 241b and 242b which hold the respective wheels 241a and 242b in a manner to enable rotation thereof.

As seen in FIG. 12, the guide roller 241 is fixed on an upper part of the face of the water collecting bucket 15 where the moving sprocket 37 is disposed. More specifically, the base material 241b is fixed to the water collecting bucket 15, and the wheel 241a is arranged to face an inner surface 13a of the water collecting pit.

As seen in FIG. 12, the guide roller 242 is fixed on a lower part of the face of the water collecting bucket 15 where the moving sprocket 37 is disposed. More specifically, the base material 242b is fixed to the water collecting bucket 15, and the wheel 242a is arranged to face the inner surface 13a of the water collecting pit.

Herein, the wheels 241a and 242a do not necessarily have to contact the inner surface 13a of the water collecting pit at all times, but it is preferable for a gap between them to be small. Thereby, inclination of the water collecting bucket 15 can be prevented.

According to the device 240 for inhibiting inclination of the water collecting bucket configured as above, the guide rollers 241 and 242 provided on both sides in the right-and-left direction are either contacted or positioned very closely to the inner surface 13a of the water collecting pit. Therefore, inclination of the water collecting bucket itself is restricted. At this time, since the guide rollers 241 and 242 contact the inner surface 13a of the water collecting pit by means of the wheels 241a and 242a respectively, the water collecting bucket 15 is not hindered from moving up and down.

Thereby, inclination of the water collecting bucket 15 and the water blocking board 16 is inhibited, leading to high certainty of smooth operation thereof.

DESCRIPTION OF THE REFERENCE NUMERALS 1 water blocking board apparatus
2 passage open-close part
3 mechanism accommodation part
13 water collecting pit
14 water blocking board accommodating pit
15 water collecting bucket
16 water blocking board
31 transmission mechanism
32 lifting chain (chain)
35 first guide sprocket
36 second guide sprocket
37 moving sprocket (sprocket wheel)

40 device for inhibiting inclination of water collecting bucket
41 connecting shaft bar
42 bearing
101 water blocking board apparatus
140 device for inhibiting inclination of water collecting bucket
201 water blocking board apparatus
240 device for inhibiting inclination of water collecting bucket

The invention claimed is:

1. A water blocking board apparatus comprising:
a water blocking board which is configured to ascend from a road surface to block water in order to prevent water from entering a building from a passage;
a water blocking board accommodating pit in a groove shape, said water blocking board accommodating pit being formed under the road surface so as to accommodate the water blocking board;
a water collecting pit in a groove shape, said water collecting pit being arranged in a passage where the water blocking board accommodating pit is formed, said water collecting pit being configured to allow water to flow thereinto upon flooding;
a water collecting bucket being a container which is disposed in the water collecting pit to accumulate water having flown into the water collecting pit and is configured to descend in the water collecting pit by a weight of the water accumulated in the water collecting bucket; and
a transmission mechanism which connects the water blocking board and the water collecting bucket with each other and converts a force for the water collecting bucket to descend into a force for the water blocking board to ascend,
wherein at least one of the transmission mechanism and the water collecting bucket is provided with a device for inhibiting inclination of the water collecting bucket which prevents the water collecting bucket from inclining.

2. The water blocking board apparatus according to claim 1,
wherein a pair of said transmission mechanisms is arranged opposite to each other interposing the water blocking board; and
the device for inhibiting inclination of the water collecting bucket prevents the water collecting bucket from inclining by synchronizing the two transmission mechanisms.

3. The water blocking board apparatus according to claim 2,
wherein the pair of said transmission mechanisms is arranged opposite to each other interposing the water blocking board;
each of the transmission mechanisms has:
a chain which connects the water blocking board and the water collecting bucket with each other; and
a sprocket wheel being a toothed wheel which is disposed at the water collecting bucket and engages the chain; and
the device for inhibiting inclination of the water collecting bucket has a connecting shaft bar being a shaft which connects rotation axes of each said sprocket wheel provided to said transmission mechanisms arranged in the opposing manner.

4. The water blocking board apparatus according to claim 3, wherein the connecting shaft bar is disposed below a ground even in a state where the water collecting bucket has risen.

5. The water blocking board apparatus according to claim 1,
wherein the pair of said transmission mechanisms is arranged opposite to each other interposing the water blocking board;
each of the transmission mechanisms has:
a chain which connects the water blocking board and the water collecting bucket with each other; and
a sprocket wheel being a toothed wheel which is disposed at the water collecting bucket and engages the chain; and
the device for inhibiting inclination of the water collecting bucket has a connecting shaft bar being a shaft which connects rotation axes of each said sprocket wheel provided to said transmission mechanisms arranged in the opposing manner.

6. The water blocking board apparatus according to claim 5, wherein the connecting shaft bar is disposed below a ground even in a state where the water collecting bucket has risen.

7. The water blocking board apparatus according to claim 5, wherein at least one of said transmission mechanisms has a descending prevention member configured to prevent the water blocking board from descending in the water board accommodating pit.

8. The water blocking board apparatus according to claim 7, wherein the descending prevention member includes: a toothed wheel; and a locking member,
wherein the locking member is configured to retain the toothed wheel to prevent the sprocket wheel from rotating in one direction.

9. The water blocking board apparatus according to claim 1, wherein at least one of the water blocking board and the water blocking board accommodating pit has a pressing member, wherein the pressing member is configured to urge the water blocking board toward an inner surface of the water blocking board accommodating pit when the water blocking board projects from the water blocking board accommodating pit.

10. The water blocking board apparatus according to claim 9, wherein the pressing member comprises a first oblique surface positioned in to an upper part of the water blocking board accommodating pit and a second oblique surface, which is disposed opposite to the first oblique surface, positioned in a lower part of the water blocking board; and the first oblique surface and the second oblique surface have contact with each other to press the water blocking board toward a seal member provided to the water blocking board accommodating pit when the water blocking board projects from the water blocking board accommodating pit.

11. The water blocking board apparatus according to claim 1, further comprising; a lid member positioned in an upper end portion of the water blocking board.

* * * * *